[11] 3,585,499

| | | |
|---|---|---|
| [72] | Inventor | Victor W. Bolie<br>1023 W. Knapp St., Stillwater, Okla. 74074 |
| [21] | Appl. No. | 792,928 |
| [22] | Filed | Jan. 22, 1969 |
| [45] | Patented | June 15, 1971 |

[54] FREQUENCY RESOLVING AUDIO DELAY LINE
7 Claims, 5 Drawing Figs.

[52] U.S. Cl. .................................................. 324/77, 333/29
[51] Int. Cl. ..................................................... G01r 23/16
[50] Field of Search .......................................... 324/77 H, 78; 333/29

[56] References Cited
UNITED STATES PATENTS
3,026,475  3/1962  Applebaum ................. 324/77

*Primary Examiner*—Edward E. Kubasiewicz
*Attorney*—Head and Johnson

ABSTRACT: This invention relates to a frequency resolving audio delay line in the form of a ladder network consisting of a series of inverted L sections in which a universally applicable resistance value and a universally applicable Q value are used in each inverted L section.

INVENTOR.
VICTOR W. BOLIE
BY
Head & Johnson
ATTORNEYS

FREQUENCY RESOLVING AUDIO DELAY LINE

CROSS REFERENCE

This disclosure is not related to any pending United States or foreign patent application.

BACKGROUND AND SUMMARY OF THE INVENTION

This patent disclosure is related in general to the spectral characteristics of time-varying electrical signals in the audio frequency range of 50 cycles per second to 10,000 cycles per second, and is related more specifically to the problem of presenting a real-time display of the entire spectrum of the electrically represented audio signal as it is propagated through a frequency dispersive ladder network.

A conventional spectral analysis of an audio signal consists of the recording of a portion of the signal on a continuous-tract magnetic tape or drum, followed by replay of the recorded signal segment several times into a band-pass filter and isolation amplifier which drives a square-law device or a full-wave linear rectifier to permit a subsequent low-pass RC averaging filter to develop an output voltage commensurate with the signal-segment energy or power in the frequency band determined by the upper and lower limits of the band-pass filter. Use of a voltage-tunable band-pass filter, or its heterodyne equivalent, permits the signal spectrum intensity to be recorded as a function of the center frequency of the band-pass filter. The disadvantage of this conventional spectral analysis method is that the record-and-replay process requires a time delay which is unacceptable for the resolution needed in many applications.

Another conventional spectral analysis method consists of simultaneously transmitting the time-varying audio signal into the parallel inputs to a bank of frequency-contiguous band-pass filters, each of which feeds its own rectifier and low-pass averaging filter, the parallel outputs of which may be multiplexed with a high-speed sampling switch for presentation of the real-time signal spectrum on a CRT oscilloscope. The time-delay involved in this method is essentially equal to the sum of the response-times of the narrowest band-pass filter and of the slowest averaging filter, and for numerous applications this time delay is fully acceptable. However, a major disadvantage of this method in certain applications, such as the real-time analysis of intermittent continuous and pulsatile waveforms, is that the original signal is not propagated through a frequency-dispersive medium. Furthermore, this fundamental deficiency cannot be corrected by simple additive expedients such as feeding the band-pass filters from a corresponding array of playback heads spaced linearly along a magnetic tape carrying the original audio signal.

Still another spectral analysis method has been tested and reported, e.g., see Glasser, E.; Caldwell, W. F.; and Stewart, J. L. "An Electronic Analog of the Ear," Technical Documentary Report No. AMRL-TDR-63-60, Biophysics Laboratory, Aerospace Medical Division, Air Force Systems Command, Wright-Patterson Air Force Base, Ohio, June 1963. In this method the electrically represented audio signal is propagated through the successive lumped-parameter sections of a ladder network having an overall design intended to accurately simulate the fluid-mechanical behavior of the cochlear spiral in the human ear. Each shunt arm of the ladder network consists of a resistance, an inductance, and a capacitance connected in series and tuned to a frequency which, in accord with the actual biological behavior of the human cochlea, is correspondingly generally lower if the shunt arm is more distant from the input signal source. Each series arm of the ladder network consists of a resistance and an inductance connected in series, with numerical values dependent upon the position of the section from the input signal source. The current in each shunt arm, or the voltage across one of the shunt arm elements, is periodically sampled by a high-speed sampling switch for presentation on an oscilloscope. Although this type of electronic analog cochlea may be said to have a close biological equivalence, it has a number of inherent disadvantages. For example, the design is such that the inductance increases by a factor of only 4-1 from the input end to the termination end of the ladder network, and the shunt inductance actually decreases by a factor of more than 4-1 in the same direction, with resultant nonoptimum coil utilization and general inequality of series and shunt inductors in the same ladder section. Further, the series resistance increases by a factor of more than 15-1 from the input end to the termination end of the ladder network, and the shunt resistance decreases by a factor of more than 500-1 in the same direction, with the corresponding disadvantage of general inequality of series and shunt resistances in the same ladder section. Still further, this type of design has the disadvantage of requiring an increase in the shunt capacitance by a factor of more than 100,000-1 from the input end to the termination end of the ladder network, with corresponding excessive sensitivity of the frequency dispersion characteristics of the propagation medium to the normal tolerances expected in commercially available capacitors. Finally, this type of design makes no provision in the sampling and display system for a sharply resolved response to a pure sine wave input, but produces a rather broad response which is incapable of separately identifying two pure tones which are nearly alike in frequency.

While retaining the philosophy of approximately simulating the dynamic characteristics of the human cochlea and its sensory innervation (which is described in much greater detail in the text and references of the publication Weiss, Thomas F. "A Model of the Peripheral Auditory System," Kybernetik, Band III/Heft 4, Nov. 1966, pp. 153—175) I have found a novel way of designing an appropriate frequency-dispersive ladder network which has many useful and unique advantages over previous artificial ear designs.

OBJECTIVES

The general object of this invention is to provide a frequency-resolving audio delay line which is unique in its simplicity and effectiveness.

An important specific object of the invention is to provide easily fabricatable electronic means for rapidly converting any time-varying electrical input signal contained in the audio frequency range of 64—8192 c.p.s. into an exponentially calibrated frequency spectrum.

Another object of this invention is to provide electronic means for identifying both the amplitude and frequency of any electrical input signal in the 64—8192 c.p.s. frequency range which varies sinusoidally with time.

Still another object of the invention is to provide a frequency-dispersive audio delay line in which the lower frequencies are propagated with the least attenuation through a novel ladder network, and in which an auxiliary network array provides individual and separate identification of each and every one of the successive harmonics of a nonsinusoidal electrical input signal in the audio frequency range of 64—8192 c.p.s.

Still another object of the invention is to provide a ladder network equivalent of an exponentially calibrated frequency-dispersive audio delay line in which every resistance in every reactive section of the ladder is equal to the same value in which the series inductance and the shunt inductance in any given section have equal values, and in which the entire range of capacitance values from the input end of the ladder to the termination end spans a ratio of no more than 150-1.

BRIEF DESCRIPTION OF THE DRAWINGS

These, as well as other objects of the invention will be understood by referring to the following description and claims, taken in conjunction with the drawings in which:

DETAILED DESCRIPTION

Figure 1:
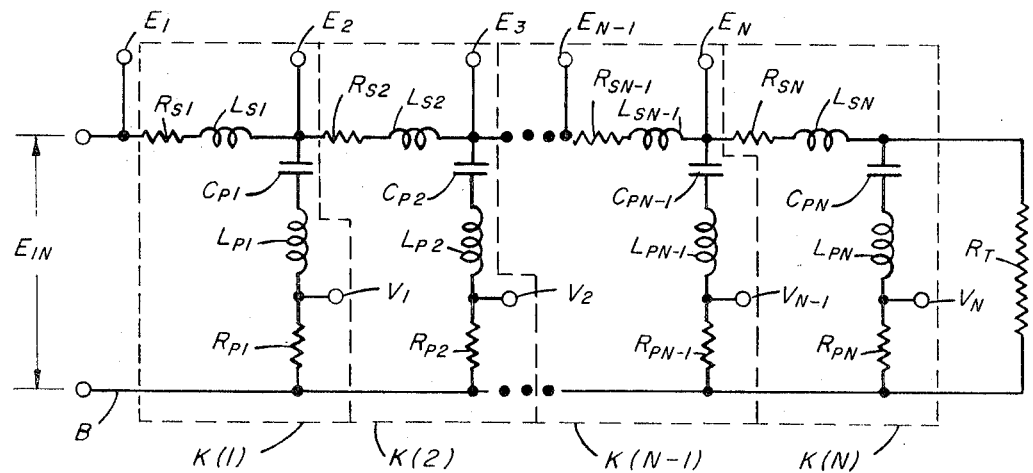
FIG. 1 is a simplified illustration of the basic structure of the ladder network, which performs the function of the harmonically calibrated frequency-resolving audio delay line, with labeled taps on each series arm and on each shunt arm of the ladder.

Referring now to FIG. 1, the ladder network which performs the functions of the harmonically calibrated frequency-resolving audio delay line is seen to consist of a sequence of inverted L sections. Each inverted L section includes a series arm and a shunt arm, each series arm consisting of an inductance $L_s$ in series with a resistance $R_s$. Each shunt or parallel arm consists of a resistance $R_p$, capacitance $C_p$, and inductance $L_p$ connected in a series arrangement.

The successive inverted L sections of the ladder are identified by corresponding successive values of the index K, starting with $K=1$ for the first inverted L section, which is connected to the input signal source, and ending with $K=N$ for the last inverted L section, which is connected to the terminal resistance $R_t$. Each inverted L section has its own series arm consisting of the resistance $R_s$ in series with the inductance $L_s(K)$, and its own shunt arm consisting of a series combination of the resistance $R_p$, the inductance $L_p(K)$, and the capacitance $C_p(K)$. Each shunt arm is arranged so that the resistance element $R_p$ is connected to the common ground bus B, and the inductance element $L_p$ is located between the resistance element $R_p$ and the capacitance element $C_p$. A particular design feature of this invention is that the resistance $R_s$ in the series arm and the resistance $R_p$ in the shunt arm are identical to the same value not only within the same inverted L section, but also equal to the same value (typically 100 ohms) in every inverted L section. Another particular design feature is that within a given inverted L section the series arm inductance $L_2$ and the shunt arm inductance $L_p$ are equal to the same value.

Since the shunt arm of each inverted L section consists of a resistance $R_p$, capacitance $C_p$ and inductance $L_p$, the shunt arm has its own particular resonant frequency $F(K)$ given by the formula $$F(K) = [2\pi\sqrt{L_p(K) \cdot C_p(K)}]^{-1}$$

It is a particular design feature of this invention that the resonant frequency of the shunt arm of the Kth inverted L section of the ladder network is specified by the formula $$F(K) = \mathrm{Exp}\left[\left(13 - 7\frac{K-1}{N-1}\right)Ln\ 2\right]$$

in which N is the total number of ladder sections (typically 100), $Ln2 \doteq 0.693$, and $\mathrm{Exp}[x] = e^x$ is the exponential function.

Still another particular design feature of this invention is that at the resonant frequency $F(K)$ of the Kth shunt arm the dimensionless ratio $2\pi F(K) \cdot L_p(K)/R_p$ of the shunt arm inductive reactance to the shunt arm resistance is equal to a single universally applicable value Q (typically 12). This feature permits the direct use of realistic and practical inductors, all having the same resonant Q value.

The above design concepts and formulas permit the inductance $L(K)$ in the series arm and $L_p(K)$ in the shunt arm of the Kth inverted L section to be equal to $$QR_p/2\pi F(K)$$

and the capacitance $C_p(K)$ in the Kth shunt arm to be specified by the formula $$C_p(K) = 1/QR_p \cdot 2\pi F(K).$$

Using the typical values of $Q=12$ and $R=100$ ohms, it is seen that when any shunt arm is excited at its resonant frequency, the inductive reactance $[2\pi F(K) \cdot L_p(K)]$ of that shunt will be equal to $[QR_p]$ which will typically be 1200 ohms. Correspondingly, the capacitive reactance $[-2 F(K) \cdot L_p(K)]$ at the resonant frequency will be equal to $[-QR_p]$ which will typically be −1200 ohms. As a compromise between an open circuit termination and a short circuit termination of the complete delay line, the terminal resistance $R_t$ is chosen to be equal to $QR_p$, typically 1200 ohms.

As shown in FIG. 1, the leftmost starting point of each successive inverted L section is connected to a voltage sampling tap E. These successive taps are labeled E(1), E(2) ...E(N). For convenience of illustration, the junction between the resistance and the inductance in each shunt arm is connected to another voltage sampling tap, and this series of taps is labeled V(1), V(2)...V(N). If the input signal to the ladder network varies sinusoidally with time, in correspondence with a pure tone audio signal of a given frequency F, then the symbol E(K) will be a pair of numbers like $|E(K)|$, $\theta(K)$, where $|E(K)|$ and $\theta(K)$ represent, respectively, the amplitude and the phase angle lag of the voltage appearing at the Kth series arm tap. Similarly, for the pure tone input, the symbol V(K) will be a pair of numbers like $|V(K)|$, $\Phi(K)$, where $|V(K)|$ and $\Phi(K)$ represent, respectively, the amplitude and the phase angle lag of the voltage appearing at the Kth shunt arm tap.

The ladder network configuration shown in FIG. 1 is thus intended to serve as a frequency dispersive audio transmission line in which the lower frequency signals travel along the line with the least attenuation. Inasmuch as the line is purposely made glossy, even the lowest frequency audio signal (typically of 64 c.p.s.) is substantially attenuated as it travels down the line. The amount of this lowest frequency attenuation is a function of the universally applicable resonant Q value. A Q value which is too high results in excessive signal reflections in the line. A Q value which is too low results in a broadly distributed and thus poorly resolved response to a pure tone input. The optimum Q value is higher for a larger number of ladder sections comprising the transmission line, but for $N=80$ the optimum Q value is approximately 10. Due to the attenuation characteristics of the line, the amplitude of an input signal of high frequency should be made substantially less than the amplitude of an input signal of low frequency, in order to ensure that the resonant currents in the shunt arms near the input signal source do not become excessive. Fortunately, this condition is very well satisfied in the case of input signals emanating from human speech (e.g., see: G. Fant, et al., "Formant Amplitude Measurements," pp. 1753—1761, Nov., 1963). In the case of an input signal emanating from a variable frequency oscillator, this desirable frequency dependent condition on the amplitude of the input signal is easily achieved with the aid of a low pass RC filter of 6—12 decibels per octave attenuation for frequencies above 64 c.p.s., inserted between the input end of the ladder network and a constant amplitude signal source of adjustable frequency. This permits the use of shunt arm inductors of uniform power rating throughout the ladder network, since the amplitude of the resonant current in any one of the shunt arms is then approximately the same as the resonant current amplitude in any other shunt arm.

Figure 2:
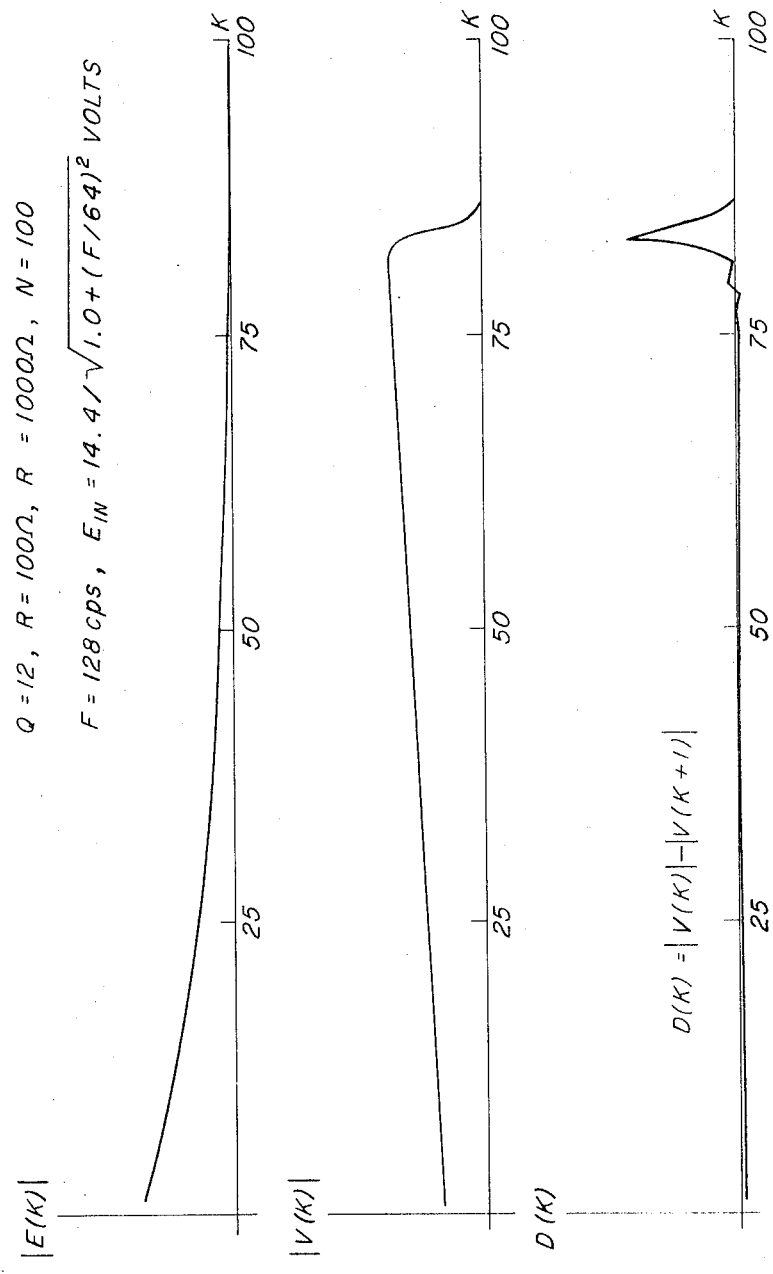
FIG. 2 is a triplet of three graphs showing the amplitudes of the tapped voltages, and the successive amplitude differences, for a single 128 c.p.s. sinusoidal voltage input to the ladder networks of 100 sections.

FIG. 2 is a triplet of three graphs having the same horizontal axis, along which the ladder network section number K is indexed from 0 to 100. The upper, middle and lower traces show the response of the 100 section ladder network to a pure tone input signal having a frequency of 128 cycles per second, and an amplitude equal to the output of a single section low pass RC filter, driven with a 14.4 volt, 128 c.p.s., sine wave, and having a cutoff frequency of 64 cycles per second. The Q factor is 12, the universal resistance R, that is $R_s$ and $R_p$, is 100 ohms, and the terminal resistance $R_t$ is 1200 ohms. The vertical scale $|E(K)|$ in the upper trace of FIG. 2 shows the relative amplitudes of the 128 c.p.s. signal voltage as measured from the sequence of series arm taps. The attenuation of the 128 c.p.s. signal as it travels along the ladder network is clearly evidenced. The vertical scale |V(K)| in the middle trace of FIG. 2 shows the relative amplitudes of the 128 c.p.s. signal voltage measured from the sequence of taps in the shunt arms of the ladder network. Since each signal amplitude |V(K)| is essentially the voltage drop across the universal resistance R, the middle trace in FIG. 2 indicates directly the relative amplitudes of the shunt arm currents in the ladder network. It is seen from this |V(K)| profile that within a certain segment of the ladder network adjoining the attenuated input signal source the amplitudes of the successive shunt arm currents do not vary appreciably with increasing number of sections traversed by the signal. Beyond this certain segment, however, the shunt arm currents, in the terminating remainder of the ladder network, are all of nearly zero amplitude. The shunt arm which separates the first segment from the terminating segment is that which has its resonant frequency approximately equal to the frequency of the attenuated input signal. This particular shunt arm which resonates with the input signal frequency may be referred to as the "sympathetic arm." Finally, the vertical scale D(K) in the lower trace in FIG. 2 shows the spatial derivative of the |V(K)| profile. This spatial derivative is comprised of the successive |V(K)| differences, i.e., $$D(K) = |V(K)| - |V(K+1)|.$$

From the above principles, and as evidenced in the lower trace in FIG. 2, it is clear that the D(K) profile is one which will isolate and identify the "sympathetic arm."

Figure 3:
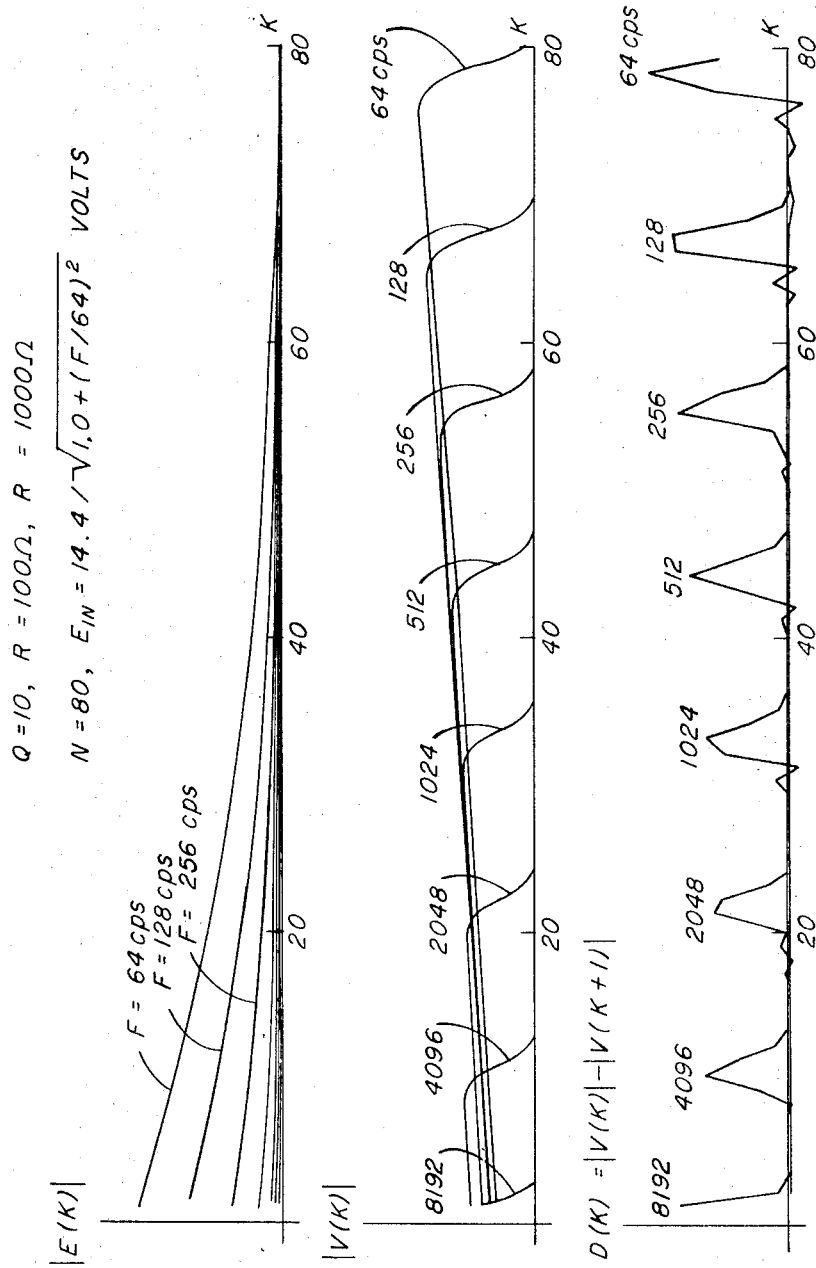
FIG. 3 is a triplet of three graphs in which the same information is superimposed sequentially for input frequencies of 64, 128, 256, 512, 1024, 4096 and 8192 c.p.s.

FIG. 3 shows the same information as just discussed for FIG. 2, except that on each of the three graphs of |E(K)|, |V(K)|, and D(K) are superimposed the eight traces corresponding to eight different and separately attenuated input signals having the pure tone frequencies of 64, 128, 256, 512, 1024, 2048, 4096, and 8192 cycles per second. These harmonically related input signals were chosen to illustrate the fact, which is demonstrated by the eight superimposed D(K) traces in FIG. 3, that the frequency resolving audio delay line of this invention has the intended property of isolating and displaying, on a calibrated scale, the fundamental and all of the harmonics of any input signal in the 64—8192 c.p.s. audio frequency range. It is a novel feature of this invention that the harmonics thus isolated and displayed are equally spaced along the length of the ladder network, as calibrated by the sequence of digits set in one to one correspondence with the successive ladder sections. Since every parameter of the ladder network is a linear element, it is apparent that the D(K) profile exemplified in FIG. 3 will also exhibit the relative amplitudes of the various harmonics of any input signal in the audio frequency range.

The accuracy with which the frequency of a particular pure tone input signal is resolved, i.e., the width of the peaked excursion of the lower trace in FIG. 2, is naturally a function of the number of sections used to construct the frequency resolving audio delay line. A larger number of sections affords a greater accuracy of pure tone resolution by permitting the use of a higher Q value without causing spurious reflections in the line.

Figure 4:
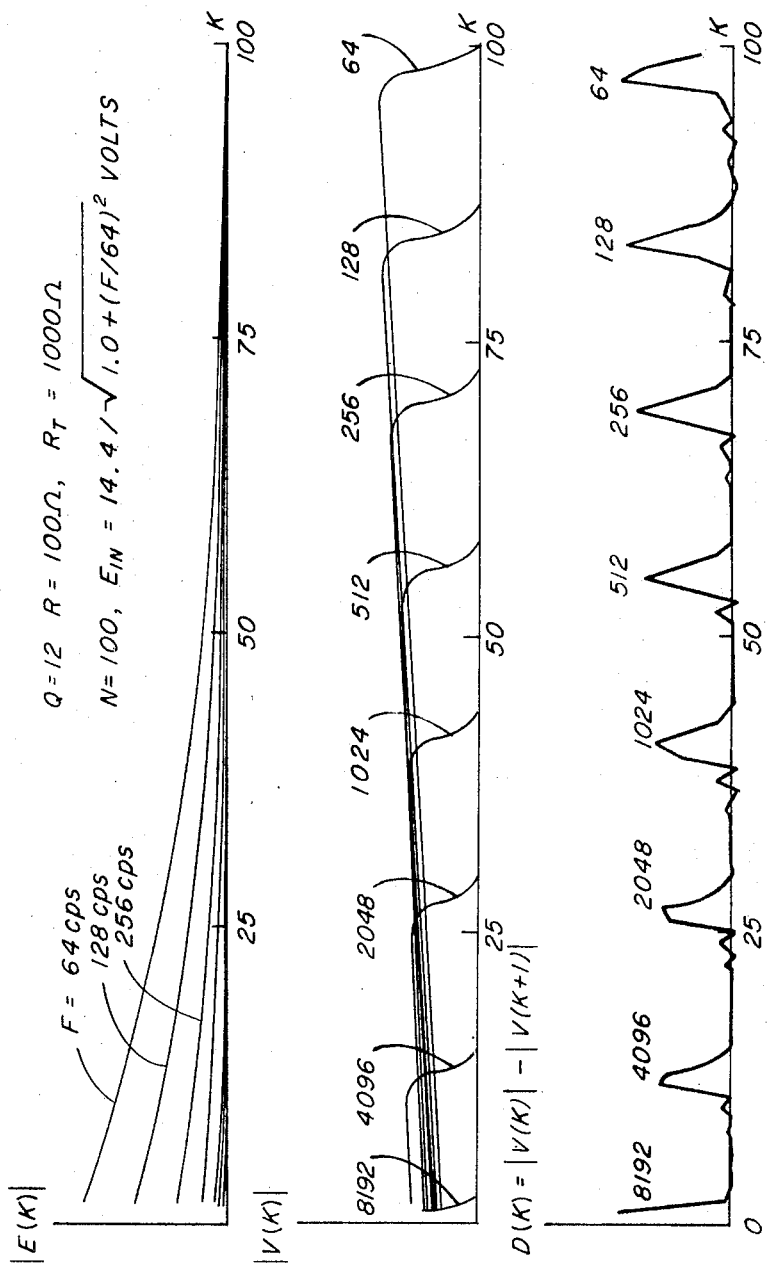
FIG. 4 shows the same information as FIG. 3, except that the total number of sections in the ladder network has been reduced from 100 to 80.

FIG. 4 shows the same information as just discussed for FIG. 3, except that the total number of sections N in the ladder network has been reduced from 100 to 80, and the universal Q value has been reduced from 12 to 10. Although the reduction in the number of sections did produce a slight loss in frequency resolving accuracy, it is apparent from the lower graph in FIG. 3 that the design principles of this invention do give the desired D(K) profiles of equally spaced harmonics.

Table 1 shows a tabulation of the design parameters required in each section of the ladder network representing the frequency resolving audio delay line, in the case for which the total number of sections is $N=80$, the universal $Q$ is $Q=10$, the universal resistance ($R_s$ and $R_p$) is 100 ohms, and the terminal resistance is $R_t=1000$ ohms. In the four columns of numerical data shown in Table 1, the first (leftmost) column shows the section number $K$, starting at the top of the column with the section number $K=80$, corresponding to the end of the line far from the input signal source. The second column of data shows, in cycles per second, the corresponding resonant frequencies of the successive shunt arms of the ladder network, in standard exponential notation, e.g., the first entry $F(80)=.639E+02$ is identical to $F(80)=0.639 \times 10^2 = 63.9$ c.p.s. Thus, the resonant frequencies for the shunt arms increase monotonically in an exponential manner from an indicated 63.9 cycles per second at the terminal end of the line to an indicated 8170 cycles per second at the input end of the line. The advantageous characteristic that this range and distribution of shunt resonant frequencies is maintained irrespective of the total number of sections in the ladder network is another unique attribute of this invention. The third and fourth columns of data in Table 1 show, in henries and farads, respectively, the inductance L(K), that is $L_s$ and $L_p$, and the capacitance C(K), that is $C_p$, required in each inverted L section of the 80 section ladder network. It is seen that the inductance $L(K)$ decreases monotonically from $L(80)=2.48$ henries to $L(1)=.0194$ henries as the input end of the ladder network is approached. Similarly, the capacitance $C(K)$ decreases monotonically from $C(80)=2.48$ microfarads to $C(1)=0.0194$ microfarads as the input end of the ladder network is approached. It is readily apparent to those skilled in the electronics arts that the values and ranges of the parameters N, Q, $R_s$, $R_p$, $R_t$, K, F(K), $L_s$, $L_p$ and $C_p$ are realistic and easily realized in commonly available components.

TABLE 1

[$N=80$   $Q=10$   $R=100$ ohms   $R_t=1,000$ ohms]

| K Number: | F(K), c.p.s. | L(K), henries | C(K), farads |
|---|---|---|---|
| 80 | .639E+02 | .248E+01 | .248E−05 |
| 79 | .679E+02 | .234E+01 | .234E−05 |
| 78 | .722E+02 | .220E+01 | .220E−05 |
| 77 | .768E+02 | .207E+01 | .207E−05 |
| 76 | .817E+02 | .194E+01 | .194E−05 |
| 75 | .869E+02 | .183E+01 | .183E−05 |
| 74 | .924E+02 | .172E+01 | .172E−05 |
| 73 | .982E+02 | .161E+01 | .161E−05 |
| 72 | .104E+03 | .152E+01 | .152E−05 |
| 71 | .111E+03 | .143E+01 | .143E−05 |
| 70 | .118E+03 | .134E+01 | .134E−05 |
| 69 | .125E+03 | .126E+01 | .126E−05 |
| 68 | .133E+03 | .119E+01 | .119E−05 |
| 67 | .142E+03 | .112E+01 | .112E−05 |
| 66 | .151E+03 | .105E+01 | .105E−05 |
| 65 | .160E+03 | .990E−00 | .990E−06 |
| 64 | .170E+03 | .931E−00 | .931E−06 |
| 63 | .181E+03 | .876E−00 | .876E−06 |
| 62 | .193E+03 | .824E−00 | .824E−06 |
| 61 | .205E+03 | .775E−00 | .775E−06 |
| 60 | .218E+03 | .728E−00 | .728E−06 |
| 59 | .232E+03 | .685E−00 | .685E−06 |
| 58 | .246E+03 | .644E−00 | .644E−06 |
| 57 | .262E+03 | .606E−00 | .606E−06 |
| 56 | .279E+03 | .570E−00 | .570E−06 |
| 55 | .296E+03 | .536E−00 | .536E−06 |
| 54 | .315E+03 | .504E−00 | .504E−06 |
| 53 | .335E+03 | .474E−00 | .474E−06 |
| 52 | .356E+03 | .445E−00 | .445E−06 |
| 51 | .379E+03 | .419E−00 | .419E−06 |
| 50 | .403E+03 | .394E−00 | .394E−06 |
| 49 | .429E+03 | .370E−00 | .370E−06 |
| 48 | .456E+03 | .348E−00 | .348E−06 |
| 47 | .485E+03 | .328E−00 | .328E−06 |
| 46 | .515E+03 | .308E−00 | .308E−06 |
| 45 | .548E+03 | .290E−00 | .290E−06 |
| 44 | .583E+03 | .272E−00 | .272E−06 |
| 43 | .620E+03 | .256E−00 | .256E−06 |
| 42 | .569E+03 | .241E−00 | .241E−06 |
| 41 | .701E+03 | .226E−00 | .226E−06 |
| 40 | .745E+03 | .213E−00 | .213E−06 |
| 39 | .792E+03 | .200E−00 | .200E−06 |
| 38 | .843E+03 | .188E−00 | .188E−06 |
| 37 | .896E+03 | .177E−00 | .177E−06 |
| 36 | .953E+03 | .166E−00 | .166E−06 |
| 35 | .101E+04 | .157E−00 | .157E−06 |
| 34 | .107E+04 | .147E−00 | .147E−06 |
| 33 | .114E+04 | .138E−00 | .138E−06 |
| 32 | .121E+04 | .130E−00 | .130E−06 |
| 31 | .129E+04 | .122E−00 | .122E−06 |
| 30 | .137E+04 | .115E−00 | .115E−06 |
| 29 | .146E+04 | .108E−00 | .108E−06 |
| 28 | .155E+04 | .102E−00 | .102E−06 |
| 27 | .165E+04 | .960E−01 | .960E−07 |
| 26 | .176E+04 | .903E−01 | .903E−07 |
| 25 | .187E+04 | .849E−01 | .849E−07 |
| 24 | .199E+04 | .799E−01 | .799E−07 |
| 23 | .211E+04 | .751E−01 | .751E−07 |

Table I—Continued

| K Number: | F(K), c.p.s. | L(K), henries | C(K), farads |
|---|---|---|---|
| 22 | .225E+04 | .706E−01 | .706E−07 |
| 21 | .239E+04 | .664E−01 | .664E−07 |
| 20 | .254E+04 | .625E−01 | .625E−07 |
| 19 | .270E+04 | .587E−01 | .587E−07 |
| 18 | .287E+04 | .552E−01 | .552E−07 |
| 17 | .306E+04 | .519E−01 | .519E−07 |
| 16 | .325E+04 | .488E−01 | .488E−07 |
| 15 | .346E+04 | .459E−01 | .459E−07 |
| 14 | .368E+04 | .432E−01 | .432E−07 |
| 13 | .391E+04 | .406E−01 | .406E−07 |
| 12 | .416E+04 | .382E−01 | .382E−07 |
| 11 | .442E+04 | .359E−01 | .359E−07 |
| 10 | .470E+04 | .338E−01 | .338E−07 |
| 9 | .500E+04 | .318E−01 | .318E−07 |
| 8 | .531E+04 | .299E−01 | .299E−07 |
| 7 | .565E+04 | .281E−01 | .281E−07 |
| 6 | .601E+04 | .264E−01 | .264E−07 |
| 5 | .639E+04 | .248E−01 | .248E−07 |
| 4 | .680E+04 | .234E−01 | .234E−07 |
| 3 | .723E+04 | .220E−01 | .220E−07 |
| 2 | .768E+04 | .206E−01 | .206E−07 |
| 1 | .817E+04 | .194E−01 | .194E−07 |

Figure 5:
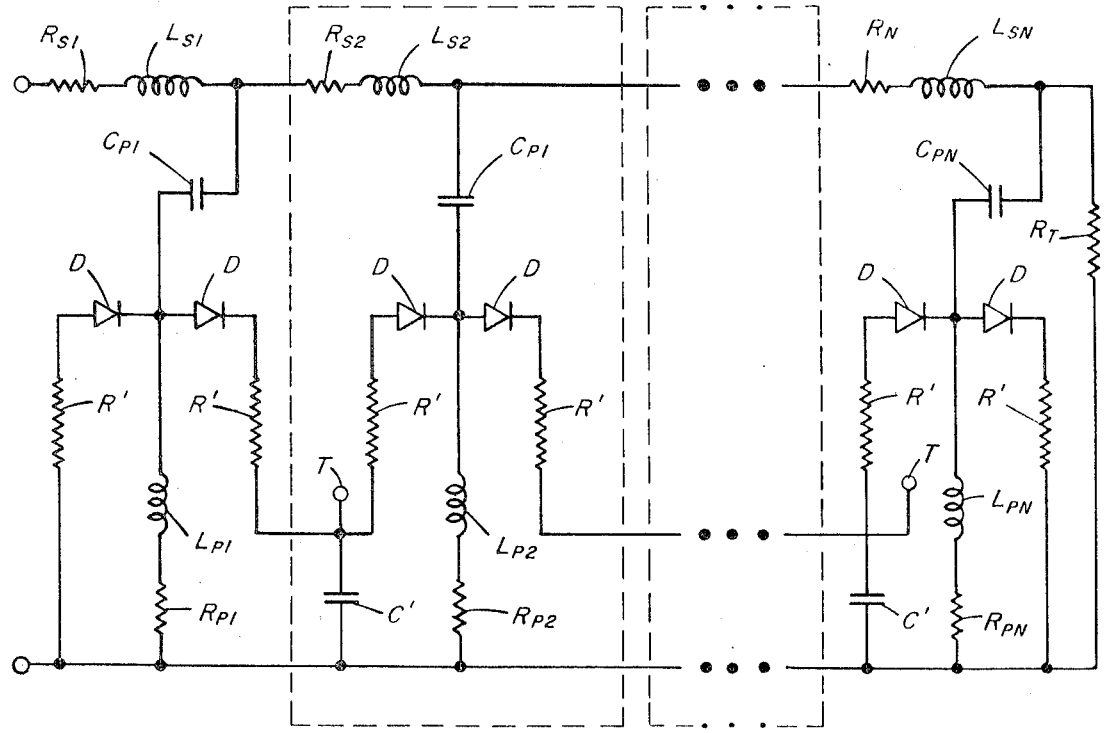
FIG. 5 shows a schematic diagram of a frequency-resolving audio delay line of this invention with rectifying spatial derivative taps.

FIG. 5 shows the frequency resolving audio delay line of this invention, as in FIG. 1, including diodes D, resistances R, and capacitors C, providing rectifying spatial derivative taps T.

While the invention is described in a certain degree of particularity, it is manifest that many changes may be made without departing from the spirit and scope of this invention.

I claim:

1. An electrically tapered audio delay line of passive linear elements arranged in the configuration of a ladder network,
   said network having at its input end a first and second input terminal;
   said network having at its terminal end a resistive terminal element having a first and second terminal, said terminal element serving as a partially reflective termination;
   said network including a ground bus of very low resistance extending from the first terminal of said resistive terminal element to the first of said input terminals;
   said ladder network including a connected sequence of inverted L sections, each inverted L section having a shunt arm extending at one end thereof to said ground bus, and a series arm having one end extending from the other end of said shunt arm;
   the first of said inverted L sections having the other end of its series arm connected to the second input terminal, the last of said inverted L sections having the junction of its series and shunt arms connected to the second terminal of said resistive terminal element, each intermediate inverted L section having the junction of its series and shunt arms connected to said other end of the series arm of the succeeding section, the series arm of each said inverted L section including a resistive element in series with an inductive element, the shunt arm of each said inverted L section including a capacitive element in series with an inductive element, which in turn is in series with a resistive element, one end of the resistive element being connected to said ground bus, the series arm and shunt arm inductive elements in each individual inverted L section being of the same value;
   said shunt arms in said sequence of inverted L sections being tuned to series resonate with a corresponding sequence of resonant frequencies which begin at the higher limit of the audio spectrum for the section adjoining said input terminals and progressively decreases in an exponential manner to end at the lower limit of the audio spectrum for the section adjoining said resistive terminal element, said resistive elements in both said series and shunt arms of said inverted L sections all being of the same universal resistance value, and the ratio of inductive reactance to resistance in each said shunt arm at its resonant frequency being equivalent to a universal Q value.

2. An audio delay line according to claim 1 in which said resistive terminal element has a value of resistance approximately equal to said universal resistance value multiplied by said universal Q value.

3. An audio delay line according to claim 1 in which said universal resistance value has a magnitude of approximately 100 ohms.

4. An audio delay line according to claim 1 in which said universal Q value has a magnitude of approximately 10 when said ladder network consists of approximately 80 inverted L sections.

5. An audio delay line according to claim 1 in which said capacitive element in each said shunt arm has a capacitance selected to approximately cancel the inductive reactance in said shunt arm at its prescribed resonant frequency.

6. An audio delay line according to claim 1 including a sequence of ground referenced voltage sampling terminals, each connected to said shunt arm of an inverted L section at the point of junction of said shunt arm resistive and inductive elements.

7. An audio delay line according to claim 1 including a nonlinear three-terminal tee-network between each adjacent pair of said inverted L sections,
   said nonlinear three-terminal tee-network comprised in part by a left terminal connected to the juncture of said shunt arm capacitive and inductive elements of a first inverted L section and a right terminal connected to the juncture of said shunt arm capacitive and inductive elements of a second adjacent inverted L section, and a lower terminal connected to said ground bus;
   said tee-network comprised in further part by a first series combination of a diode and a current limiting resistance arranged to permit a small current to flow only from said first inverted L section shunt arm, and a second series combination of a diode and a current limiting resistance arranged to permit a small current to flow only from said second inverted L section shunt arm, said first and second series combination of a diode and a current limiting resistance being joined together at an intermediate terminal; and
   a voltage averaging capacitor inserted between said intermediate terminal of each of said tee-networks and said bus bar.